United States Patent [19]
Quick

[11] 4,013,309
[45] Mar. 22, 1977

[54] REPAIR KIT FOR PLASTIC PIPE

[76] Inventor: William H. Quick, 1818 Kanola Road, La Habra, Calif. 90631

[22] Filed: Nov. 17, 1975

[21] Appl. No.: 632,406

Related U.S. Application Data

[63] Continuation-in-part of Ser. No. 370,013, June 14, 1973, abandoned.

[52] U.S. Cl. .................................. 285/31; 285/156; 285/332; 285/423; 285/DIG. 16
[51] Int. Cl.² ..................... F16L 13/10; F16L 47/00
[58] Field of Search .............. 285/15, 31, 332, 369, 285/423, DIG. 16, 32, 260, 156

[56] References Cited

UNITED STATES PATENTS

| | | | |
|---|---|---|---|
| 2,735,699 | 2/1956 | Chadbourne | 285/260 X |
| 3,254,650 | 6/1966 | Collito | 285/DIG. 16 |
| 3,466,066 | 9/1969 | Dawson | 285/332 |
| 3,768,841 | 10/1973 | Byrne et al. | 285/423 X |
| 3,781,041 | 12/1973 | Petzetakis | 285/423 X |
| 3,857,588 | 12/1974 | Curtin | 285/31 |

FOREIGN PATENTS OR APPLICATIONS

| | | | |
|---|---|---|---|
| 1,117,802 | 6/1968 | United Kingdom | 285/31 |

*Primary Examiner*—Thomas F. Callaghan

[57] ABSTRACT

A repair or coupling kit for repairing previously installed plastic pipe without need for disturbing the installed condition of the pipe. The kit includes a minimum of two and a maximum of three tubular parts designed for telescopic assembly to the adjacent ends of the broken pipe. One of the parts is a coupling sleeve spanning the break and with its end portions adhesively bondable to the exterior of the parts bridged. All bonded surfaces preferably have an interference telescopic fit when assembled.

14 Claims, 9 Drawing Figures

REPAIR KIT FOR PLASTIC PIPE

This application is a continuation in part of my copending application for U.S. Ser. No. 370,013, filed June 14, 1973, entitled IMPROVED PIPE COUPLING and now abandoned.

BACKGROUND OF THE INVENTION

This invention relates to the field of non-metallic pipe made of materials commonly called plastics, wherein pressure-tight joints are made by use of a cement compatible with the type or types of plastic used in both the pipe and the fittings. Rigid PVC (polyvinyl chloride) and suitable cement is an example of the type of material used, although there are numerous others.

Conventional methods of designing the mating ends of two elements to be joined are described, for example, in U.S. Pat. No. 2,498,831, issued Feb. 28, 1950, to F. J. Veitch, entitled "Pipe Joint," and U.S. Pat. No. 2,409,283, issued Oct. 15, 1946, to J. L. Hudson, entitled "Coupling for Plastic Tubes." One element is constructed so as to telescopingly receive the other, suitable cement is applied, usually to both parts, and the assembly is completed by sliding the parts together. Various combinations of tapered and cylindrical sections are in common use.

It is also customary to design such telescopingly joined surfaces so that there is an interference fit, i.e., a fit which can be described as very tight. The parts, typically, fit too tightly to be fully engaged when dry. The lubrication provided by the wet cement, however, facilitates the assembly. Thus when an untapered pipe end is joined to a tapered fitting, the interference fit gives rise to a certain conforming of the parts so that a joint of reasonable length is formed without requiring the cement to fill a void.

A drawback in this method of assembling a plumbing system is evidenced when parts which are to be joined have already been connected to the system in such a way as to prevent any appreciable relative axial motion between the two parts to be joined. An example of this occurs, for example, when piping is buried underground, as in a sprinkler system for vegetation, and it is desired to unearth a section of pipe to make a plumbing change, such as to repair a leak, or to add a T fitting to expand the service. The plastic pipe is easily cut with a saw, and necessary parts cemented in place, but in order to make the last joint, the two pipes must be moved apart axially a distance of an inch or more. To do this requires the digging up of a considerable number of feet of pipe (the amount increasing with larger diameter pipe) to enable a section of the pipe to be bowed up sufficiently to permit its end to retract the required distance.

As difficult as is this procedure, it is frequently used because the alternatives are somewhat costly and not fully satisfactory. To the knowledge of the inventor, all alternatives involve one or more mechanical joints. The device perhaps most commonly used is a coupling which consists of a brass cylindrical body, fitting loosely over the ends of the pipes to be coupled; compliant packing rings at each end are held by brass caps which fit around the pipes and are threaded onto each end of the brass body. These caps are tightened so as to compress the packing between the brass body and the pipe at each end. Various other couplings involving mechanical joints are also available.

These mechanical couplings have as one disadvantage the fact that they do not bring the parts together into a single fused unit as do the other joints in the plastic pipe system. Also, these mechanical couplings are not as free from slow leaks as are the cement-fused joints. Brass couplings, of the type described above, have been seen in which all attempts by workmen to obtain a leak-free joint resulted in failure. A third disadvantage is the fact that these couplings are quite expensive, to the degree that the additional cost can, for example, pay an hour's wage for a workman to dig up a section of pipe so that a simple cement-fused joint can be made.

Various proposals have been made to repair a break in installed plastic pipe but each one of these is subject to serious shortcomings and disadvantages avoided by this invention. For example, Wilhelmsen, U.S. Pat. No. 3,826,521 is exemplary and deals at length with the problem of providing a strong fluid-tight seal in an adhesive joint the interface of which does not have an interference fit. Curtin, U.S. Pat. No. 3,857,588 shows a repair kit for broken plastic pipe and including a multiplicity of telescoping parts including a replacement section each end of which must be coupled to the adjacent end of the break in the installed pipe. He does not provide for variation in the spacing between existing plastic pipe, requires additional short tubular alignment flanges, does not provide for interference fits, and also does not provide compensation for the expansion caused by interference joints, the importance of which is described below. The foreign patent art also includes a further example of attempts to solve the problem, namely, British patent 1,117,802, granted June 26, 1968. This repair kit speaks of holding the parts assembled by cementing or solvent welding but relies upon several O-rings for a fluid seal and other expedients avoided by this invention.

SUMMARY OF THE INVENTION

The repair or coupling kit provided by this invention typically comprises three molded plastic tubular components including first and second end members each designed to have an interference fit over the broken ends of the installed plastic pipe to be repaired and a third member or coupling sleeve bridging and interconnecting the adjacent ends of the two end members after these have been bonded or solvent-fused to the installed pipe. The coupling sleeve may and preferably is longer than the end members and is telescoped thereover so as to embrace a portion of each. The leading end of this sleeve has an interference fit with the exterior of both of the end members. These components are easily and reliably installed by a novice having a minimum of experience in bonded assembly of plastic pipe fittings. The end members are installed in the usual manner and the coupling sleeve is readily installed in a simply performed telescopic manipulation after the interface surfaces have been coated with an adhesive or solvent.

It is therefore a primary object of the present invention to provide a simple, inexpensive, easily installed pipe repair kit for repairing a break in installed plastic pipe without need for disturbing the installed condition of the pipe.

Another object of the invention is the provision of a plastic pipe repair kit comprising a plurality of tubular components sized to have an interference fit with the ends of the broken pipe and held secured together solely by a bonding or fusion agent in a fluid-tight manner.

Another object of the invention is the provision of a fool-proof repair kit for plastic pipe comprising two end members adapted to be installed over a respective end of the broken pipe and a coupling sleeve telescoped over and adhesively bonded to the exterior of the two end members.

Another object of the invention is the provision of a repair kit for plastic pipe comprising a plurality of components adapted to be telescopically assembled to one another and to a break in plastic pipe and so constructed as to thwart improper assembly.

Another object of the invention is the provision of a kit of plastic coupling components designed for telescopic assembly and at least one of which has its exterior relieved just sufficiently to compensate for expansion caused by the expansion of the relieved area when forcibly telescoped over the end of a plastic pipe undergoing repair.

These and other more specific objects will appear upon reading the following specification and claims and upon considering in connection therewith the attached drawing to which they relate.

Referring now to the drawing in which a preferred embodiment of the invention is illustrated:

DETAILED DESCRIPTION OF PREFERRED EMBODIMENTS

Figure 1:
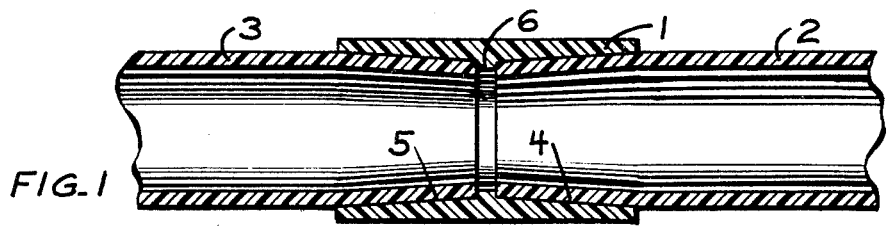
FIG. 1 is a sectional view of a conventional coupling for cement-fusing a joint between two sections of plastic pipe.

In FIG. 1 is shown a coupling 1, the type which is conventionally used for joining two sections of pipe 2 and 3 by means of cement- or solvent-fusion. The surfaces 4 and 5 of coupling 1 are shown with an exaggerated degree of taper as an aid in illustration. Likewise, the pipe sections, which had a straight cylindrical shape before assembly, are here shown with an exaggeration of that compression which is produced at their ends by assembly. Although there is also a springing out of the coupling due to the tight fit, that effect is not illustrated. A stop ring 6 is normally employed to insure that the coupling is centered when assembled.

If it were not for the tightness of the fit between the coupling and the pipe, it would be possible to make a joint in restricted-pipe-freedom situations by sliding a coupling which does not have a stop 6, in over one pipe and then back over the joint. However, because of the tightness of the parts, a tightness which increases as the coupling is forced over the pipe farther than normal, this method is not used nor, as far as is known, do manufacturers supply these couplings without the stop 6.

DETAILED DESCRIPTION OF THE INVENTION

Figure 2:
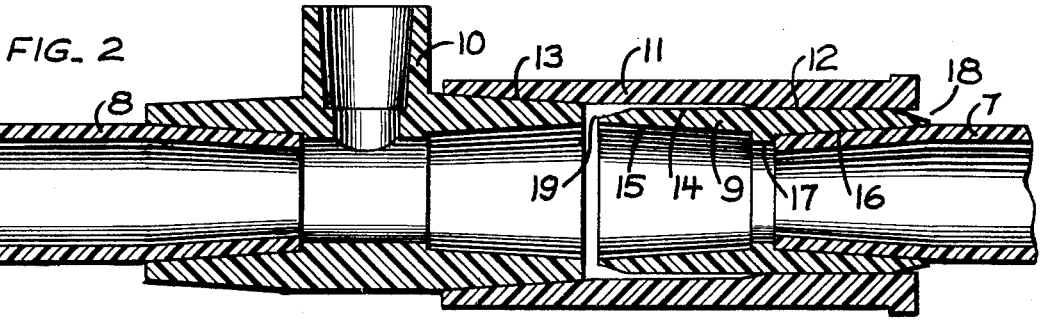
FIG. 2 is a sectional view showing one preferred embodiment of this invention repair kit assembled between the broken ends of installed plastic pipe.

FIG. 2, an illustration of a preferred embodiment of the instant invention, shows a complete assembly forming a joint between the two plastic pipes 7 and 8. A first end-piece 9 is attached by cement-fusion to the end of the pipe 7. A second end-piece 10 here shown by way of example as a T-fitting, is cement-fused to the pipe 8. It will be understood that the second end fitting may be either identical with the first end fitting 9 or one of several other configurations. The coupler-sleeve 11 is cement-fused to the first end-piece at surface 12, and to the second end-piece at surface 13, thus forming a solid cement-fused-welded joint.

In this embodiment the first end-piece is revealed by FIG. 2 to have smooth or non-threaded inner and outer surfaces of revolution including a cylindrical outer surface 12, and two oppositely tapered inner surfaces 15 and 16 separated by a stop 17. In this instance, but not necessarily in general, the first end-piece is symmetrical and can thus be installed in either of two orientations.

The second end-piece 10 is revealed in this embodiment to serve the additional function, in the ultimate assembly, of a T fitting. Attachment to the cross leg of the T is not shown in FIG. 2. Another feature of this embodiment is that the T is designed symmetrically, so that it can be assembled in either of two orientations.

Figure 3:
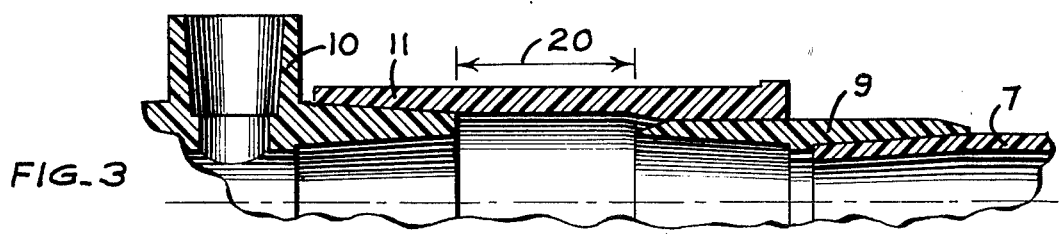
FIG. 3 is a partial sectional view showing the same embodiment as in FIG. 2, with a greater space between the ends of the two connected pipes.

The coupler-sleeve 11 in FIG. 2 is the third element of the invention is revealed in this embodiment, and is the last to be cement-fused in place during normal installation. This coupling sleeve or member likewise has smooth inner and outer surfaces of revolution. The inner surface of revolution includes a cylindrical portion 11a having a suitable axial length such as about one half the length of end member 9. The remainder of the inner surface is somewhat larger in diameter than portion 11a and preferably includes a cylindrical midportion 11b and an end portion 11c sized to have a snug interference fit with the adjacent end portion of the second end member 10. It will be understood that surface 11c may be cylindrical if the mating outer surface of member 10 is a tapering surface or surface 11c may be tapered, it merely being desirable that these mating surfaces have a snug interference fit when telescoped firmly together. As shown in FIGS. 2 and 3, surface 11c tapers with its smaller end merging with the cylindrical portion 11b.

The sequence of steps in a normal installation of the entire coupler is this first-described embodiment is as follows. After the adjacent broken ends of pipes 7 and 8 have been cut to suitable length, the coupler-sleeve 11 is slipped loosely over the pipe 7. The end-pieces 9 and 10 are then cement- or solvent-weld installed using conventional techniques. Finally the coupler-sleeve is cement- or solvent-welded into its final position after applying cement to the surfaces and then shifting it axially and forcibly into a press fit with the exterior of end fitting 10.

Application of cement or solvent to all joining surfaces of the two pipes and the two end-pieces is in the usual manner. The inside surface of the coupler-sleeve may have cement applied to it in one or a combination of manners. Alternatively, sufficient cement may be applied at adjacent locations to enable the coupler-sleeve to pick up cement during assembly. To aid in this, on the first end-piece 9 a short taper is provided at 18, and for symmetry at 19, in FIG. 2. A large bead of cement is applied to the area of 18 before final installation of the coupler-sleeve, and distribution of this cement to the coupler-sleeve is aided by the wedge formed between the taper 18 and the inner surface of the sleeve.

For the purpose of description, but not for limitation, one alternative method of applying the cement or solvent to the inner surface of the coupler-sleeve is first to apply said cement to the outer surface of the pipe 7, then to move the coupler-sleeve 11 over this area so as to transfer a quantity of cement or solvent to its inner surface, then to assemble the coupler-sleeve, and finally to clean the joint and pipe surface of excess cement. If it is desirable not to leave a residue of cement on the pipe, a section of tape may be used on pipe 7 to receive and transfer the cement, said tape later being discarded.

Other optional features of the invention which are included in the embodiment shown in FIG. 2 are described as follows. It will be noted that both the first and second end-pieces 9 and 10, in addition to being reversible, are also designed so that they can be designed to serve other functions. In this embodiment the first end-piece 9 can be used, in addition to its use in this invention, as a standard coupling, and the second end-piece 10 may comprise a standard T fitting. These parts differ from conventional couplings and T fittings in that this T fitting has a frusto-conical surface of taper sized to have an interference fit with the tapered left hand end of coupler-sleeve 11. The first end-piece has chafered rims at 18 and 19 to aid cement distribution, and both parts are made sufficiently smooth and regular and within adequate dimensional tolerance to assure a strong fluid-tight joint with coupler-sleeve 11. If the second end-piece 10 is provided with a cylindrical exterior surface at 13 to join with the coupler-sleeve 11, its diameter must be larger than the diameter of the first end-piece at 12 and 14, in addition to the requirements enumerated above.

FIG. 3 illustrates the tolerance which the embodiment in FIG. 2 has for a variation in the space between the ends of the pipes which are being joined. Like parts are designated by like numerals in FIGS. 2 and 3. In FIG. 2 the ends of the pipe sections 7 and 8 are approximately as close together as is consistent with a functional joint, but in FIG. 3 the pipe ends are approximately as far apart as can be tolerated before joint strength is impaired. The distance indicated by the arrowed line segment 20 is the approximate tolerance of this embodiment to space difference.

In a variation on the embodiment of FIGS. 2 and 3, second end-piece 10 has a cylindrical surface at 13 while coupler-sleeve 11 has tapered surfaces both 13 and 12, the two tapers being usually interconnected by an intervening cylindrical surface. In this variation, said tapered surfaces mate with the cylindrical surfaces of the end-pieces at 12 and 13 using snug or interference fits as described in connection with FIG. 1.

It is clear that these end-pieces, while serving as the coupling means for the instant invention, may simultaneously serve the functions of one or more other plumbing elements, such as, but not limited to, an elbow, a valve, a cross fitting, a male adapter, a female adapter, a size reducer, etc., or one or both may serve only the function of an element of the invention.

Figure 4:
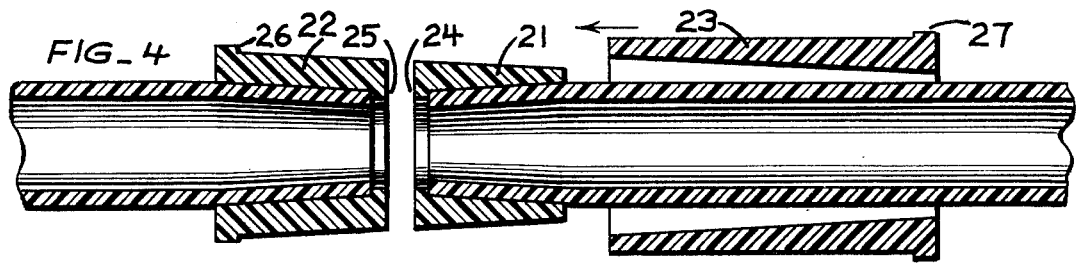
FIG. 4 is a sectional view showing a second embodiment partially assembled to a break in plastic pipe.

In FIG. 4 is shown an embodiment of the invention in which the end-pieces 21 and 22 and coupler-sleeve 23 serve only as a bonded coupling across a break in an installed length of plastic pipe. In this embodiment, all three elements have essentially the same taper. This taper is exaggerated for illustration, a fact which causes distortion of the relative wall thicknesses in the illustration. This embodiment does not have the tolerance for variation in pipe spacing as does the embodiment illustrated in FIGS. 2 and 3. The ridges 24, 25 and 26 are assembly stops, but the ridge 27 is only for end identification.

Figure 5:
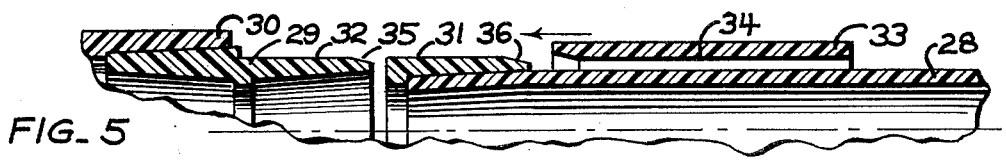
FIG. 5 is a partial sectional view of another embodiment of the invention.

FIG. 5 illustrates an embodiment in which the second end-piece 29 assembles directly to a female fitting 30. This design also illustrates the instant invention wherein both end-pieces have essentially cylindrical joining surfaces 31 and 32 of approximately the same diameter, and wherein the coupler-sleeve 33 has an essentially cylindrical mating surface 34. Tapers 35 and 36 are to aid in the assembly operation and in cement distribution.

A variation of the FIG. 5 design is one in which the second end-piece 29 has a slightly larger diameter at 32 than does the first end-piece at 31 and the coupler sleeve 33 has either a constant taper, a variable taper, or a combination of tapered and cylindrical surfaces (with or without steps), designed to fit these two cylindrical sections at 31 and 32, such fits acting in somewhat the manner in which tapered sleeve 1 in FIG. 1 fits cylindrical pipe 2 or 3. If the tapers and slight diameter differences are not to be exaggerated for illustration, then FIG. 5, within the limits of the pictorial accuracy, represents this variation. A further extension of this variation is obtained by constructing the first end-piece at 31 and the coupler-sleeve 33 longer than depicted in FIG. 5, resulting in an embodiment similar to or identical to that described above as a variation on the embodiment of FIGS. 2 and 3; this results in a tolerance to variation in pipe spacing described for the embodiment of FIGS. 2 and 3.

Figure 6:
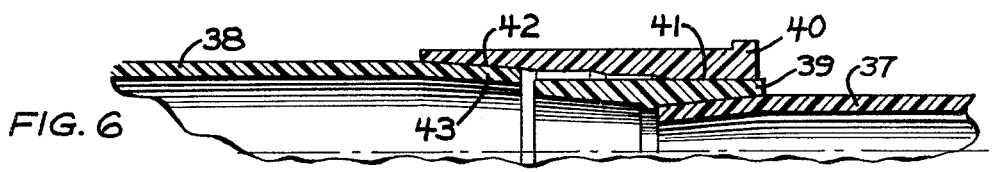
FIG. 6 is a partial sectional view showing still another embodiment of the invention in assembled condition between pipes of different diameters.

In FIG. 6 is shown an embodiment of the invention wherein a smaller pipe 37 is coupled to a larger pipe 38. In this case the larger pipe 38 serves as an untapered second end-piece, so that no separate element is needed for the second end-piece in this embodiment. In FIG. 6, the first end-piece 39 is essentially the same as 9, FIG. 2, except that the cement-distributing end tapers are not depicted on 39. The coupler-sleeve 40 in this embodiment provides a cylindrical surface 41 for contact with the first end-piece 39, and a tapered surface 42 for contact with the end of pipe 38, which pipe is compressed somewhat at 43 during assembly. This embodiment illustrates one of the ways in which this invention may be carried out wherein one of the three elements of the invention is an existing part of the plumbing system being coupled.

Figure 7:
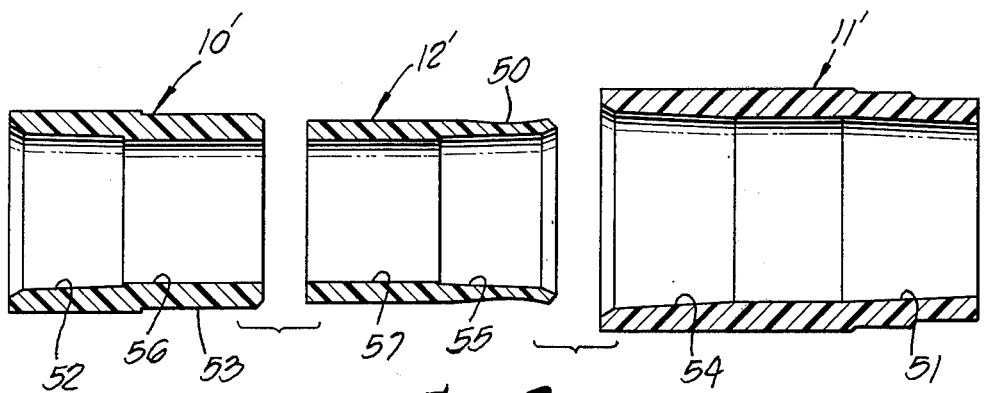
Fig. 7 is a cross-sectional view showing through another embodiment of the repair kit with the components in alignment but before installation.
Figure 8:
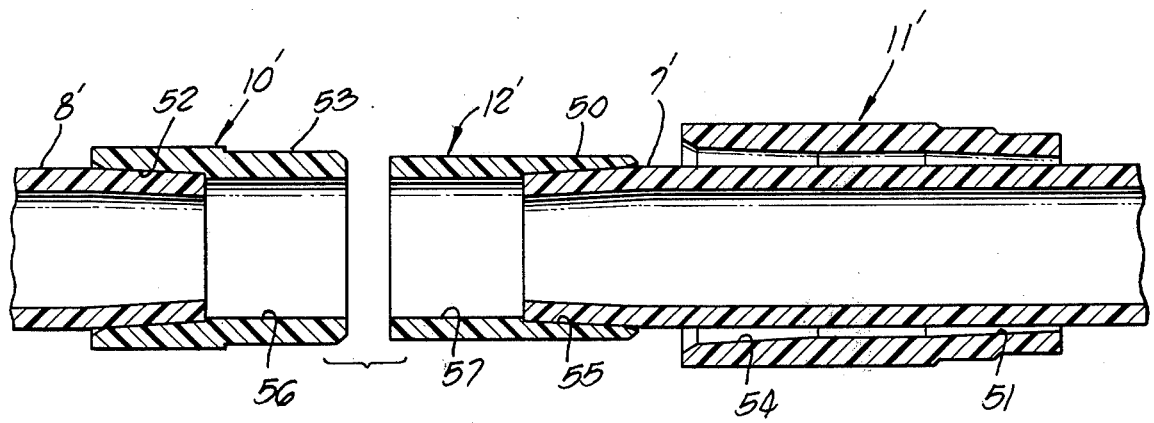
FIG. 8 is a cross-sectional view of the FIG. 7 embodiment with the end members assembled to the break in a pipe and the coupling sleeve in readiness for assembly.
Figure 9:
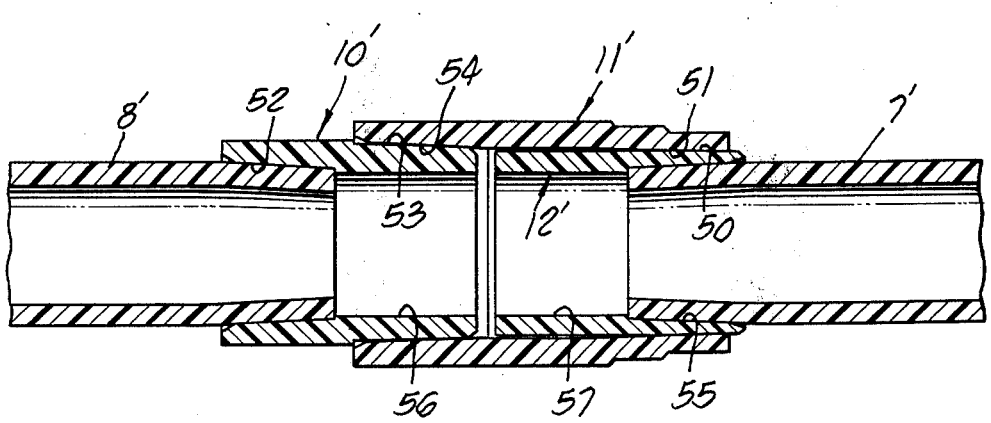
FIG. 9 shows this last embodiment fully assembled.

Still another embodiment is shown in FIGS. 7–9 which differs from the embodiments described above in several respects and particularly from that shown in FIGS. 2 and 3 in that the first end member 12' is molded with a very shallow, wide groove a few thousandths of an inch deep as indicated at 50. The remaining left hand end of end member 12' is cylindrical and has a diameter a few thousandths of an inch larger than the smaller end of the tapering interior surface 51 at the right hand end of coupling sleeve 11'. It is also pointed out that the second tubular end member 10' has an outwardly diverging interior tapered surface 52 sized to assure an interference fit with the broken end of pipe 8' and a cylindrical exterior surface 53 sized to have an interference fit with the outwardly diverging or tapering interior surface 54 at the left hand end of coupling sleeve 11'.

The purpose of the broad but shallow relief groove 50 on end member 12' is to compensate for the outward annular bulge commonly produced when the tapered interior surface 55 of end member 12' is forcibly telescoped over the end of pipe 7'. This outward bulge normally produced in end member 12' when it is telescoped over pipe 7' can interfere with the telescopic assembly of sleeve 11' over the two end members by producing at the bulge an interference fit which is more than desirable for good assembly. To avoid this, groove 50 is so dimensioned that its surface is expanded to a uniform diameter providing a uniform interference fit with the interior surface 51 of sleeve 11' when end member 12' is fully and properly assembled over pipe 7'. This assembled condition of end member 12' is illustrated in FIG. 8, it being noted that the dished surface of groove 50 is now cylindrical.

It will therefore be understood that surface 50 has a diameter sized to have a uniform interference fit with surface 51 of the coupling with the result that sleeve 11' not only can be easily telescoped over end member 12', but assurance is provided that its inner surface 51 will be bonded firmly to whatever exterior portion of member 12' it is in contact with when the leading end of sleeve 11' is fully assembled with a press fit to end member 10.

It is further pointed out that one interior end portion of members 10', 12' are sufficiently smaller in diameter as is indicated at 56 and 57 or otherwise provided with ribs, flanges or the like, serving to prevent the assembly of the kit parts improperly. Although not essential this safeguard is desirable to avoid the possibility that the wrong end of either end member could otherwise be assembled over the installed pipe undergoing repair.

It will therefore be seen that the FIGS. 7–9 embodiment of the invention provides a highly effective and efficient fluid-tight and strong connection between the ends of the broken pipe 7', 8'. As shown in FIG. 9, the adjacent ends of the two end members 10', 12' are closely adjacent one another. However, these ends can be spaced a considerable distance apart owing to the fact that the entire length of end member 12' is of uniform cylindrical diameter after it has been assembled to pipe 7'. Accordingly, surface 51 can be bonded to any portion of the length of member 12' with assurance of a strong, fluid-tight joint.

While the particular repair kit for plastic pipe herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A nonmetallic plastic pipe coupling kit for coupling together by means of suitable cement, adjacent aligned ends of previously installed plastic pipe without need for axially displacing the installed pipe, said coupling kit comprising: first and second smooth-surfaced tubular plastic end members, each having a pipe-joining end adapted to have a first and second telescopic interference fit to the exterior of a respective one of the adjacent ends of said installed plastic pipe, said first and second interference fits being produced by tapers on the inner diameters of said end members, which inner diameters taper from diameters at the pipe-joining ends, which are slightly larger than the outer diameters of said adjacent pipe ends, to diameters, inward from the pipe-joining ends, which are slightly smaller than the diameters of said adjacent pipe ends, said first and second interference fits requiring slight deformation of the joining parts upon assembly, said end members having also respective regions, beyond said tapered inner diameters wherein the inner diameter is substantially smaller than the outer diameter of said adjacent pipe ends, said regions being designed to serve as stops upon assembly of said end members to said adjacent pipe ends, a third smooth-surfaced relatively long tubular plastic coupling member having an interior surface of revolution from end-to-end thereof, one end of which has a smaller inner diameter than the other end and is sized to have a third telescopic interference fit with the exterior of said first end member, said exterior of said first end member having an essentially cylindrical surface which is approximately uniform in diameter throughout substantially all of its length, so that said one end of the interior surface of said coupling member may produce said third interference fit with the exterior surface of said first end member at essentially any location along the length of the exterior surface of said first end member, said third interference fit requiring slight deformation of the joining parts upon assembly, the remaining interior surface at said other end of said coupling member being of larger diameter than said one end portion and sized along said other end portion to have a fourth interference fit with the exterior surface of the nearest end portion of said second end member, said fourth interference fit being produced by a taper on the inner diameters of said remaining interior surface, which inner diameters taper from a diameter at said other end which is slightly larger than the outer diameter of said exterior surface of said second end member, to a diameter, inward from said other end, which is slightly smaller than the diameter of said exterior surface of said second end member, said fourth interference fit requiring slight deformation of the joining parts upon assembly, whereby said other end of said coupling member is adapted to slide loosely over said first end member and subsequently engage with an interference fit said second end member, whereby said coupling kit is adapted to produce a fluid-tight joint between said adjacent ends of said previously installed pipe, wherein the distance between said adjacent pipe ends may be such that said first and second end members, after they have been joined to said adjacent pipe ends, may be relatively close to each other, or may be spaced apart axially by a finite distance, thus allowing for ample tolerance of the coupling to variation in the initial spacing between said adjacent ends of said previously installed pipe, the four joinable contacting surfaces between the two end members, the coupling member, and the adjacent ends of the previously installed plastic pipe adapted to be held firmly bonded together in a fluid-tight manner by a bonding composition strongly adherent to the juxtaposed surfaces of said members.

2. A plastic pipe coupling kit as defined in claim 1 characterized in that at least one outer rim edge of said first end member is chamfered to aid in piloting said third tubular member thereover during the assembly of said coupling kit between the adjacent ends of previously installed plastic pipe.

3. A plastic pipe coupling kit as defined in claim 1 characterized in that the inner rim edge at the leading end of said third member is chamfered to facilitate the telescopic assembly thereof over said first and second end members.

4. A pipe coupling kit as defined in claim 1 characterized in that both of said first and second end members are so constructed that only one end of each can be telescopically assembled to an end of plastic pipe being coupled.

5. A pipe coupling kit as defined in claim 1 characterized in that one of said first and second end members is so constructed that only one end of said end member can be telescopically assembled to an end of plastic pipe being coupled.

6. A nonmetallic plastic pipe coupling kit for coupling together by means of suitable cement, adjacent aligned ends of previously installed plastic pipe without need for axially displacing the installed pipe, said coupling kit comprising:

first and second smooth-surfaced tubular plastic end members, each having a pipe-joining end adapted to have a first and second telescopic interference fit to the exterior of a respective one of the adjacent ends of said installed plastic pipe, said first and second interference fits being produced by tapers on the inner diameters of said end members, which inner diameters taper from diameters at the pipe-joining ends, which are slightly larger than the outer diameters of said adjacent pipe ends, to diameters, inward from the pipe-joining ends, which are slightly smaller than the diameters of said adjacent pipe ends, said first and second interference fits requiring slight deformation of the joining parts upon assembly, said end members having also respective regions, beyond said tapered inner diameters wherein the inner diameter is substantially smaller than the outer diameter of said adjacent pipe ends, said regions being designed to serve as stops upon assembly of said end members to said adjacent pipe ends, a third smooth-surfaced relatively long tubular plastic coupling member having an interior surface of revolution from end-to-end thereof, one end of which has a smaller inner diameter than the other end and is sized to have a third telescopic interference fit with the exterior of said first end member said exterior of said first end member having an essentially cylindrical surface which is approximately uniform in diameter throughout substantially all of its length except that a portion of this surface has, before it is assembled to any other part, slightly smaller diameters than the remainder of the surface, said slightly smaller diameters being designed to compensate for the slight expansion of the exterior surface of said first end member, which expansion results from the said slight deformation produced by the interference fit between said first end member and said adjacent plastic pipe end, this region of reduced diameters being designed so that said first end member may be assembled, with interference fit, to the adjacent plastic pipe end, and will have, after this assembly, a resultant exterior surface which has a cylindrical shape with diameters which are very close to being uniform throughout the length thereof, these uniform diameters allowing said one end of the interior surface of said coupling member to engage the exterior surface of said first member with nearly the same degree of interference, over a region of some finite axial length, at essentially any location along the length of the exterior surface of said first end member, the remaining interior surface at said other end of said coupling member being of larger diameter than said one end portion and sized along said other end portion to have a fourth interference fit with the exterior surface of the nearest end portion of said second end member, said fourth interference fit being produced by a taper on the inner diameters of said remaining interior surface, which inner diameters taper from a diameter at said other end which is slightly larger than the outer diameter of said exterior surface of said second end member, to a diameter, inward from said other end, which is slightly smaller than the diameter of said exterior surface of said second end member, said fourth interference fit requiring slight deformation of the joining parts upon assembly, whereby said other end of said coupling member is adapted to slide loosely over said first end member and subsequently engage with an interference fit said second end member, whereby said coupling kit is adapted to produce a fluid-tight joint between said adjacent ends of said previously installed pipe, wherein the distance between said adjacent pipe ends may be such that said first and second end members, after they have been joined to said adjacent pipe ends, may be relatively close to each other, or may be spaced apart axially by a finite distance, thus allowing for ample tolerance of the coupling to variation in the initial spacing between said adjacent ends of said previously installed pipe, the four joinable contacting surfaces between the two end members, the coupling member, and the adjacent ends of the previously installed plastic pipe being adapted to be held firmly bonded together in a fluid-tight manner by a bonding composition strongly adherent to the juxtaposed surfaces of said members.

7. A plastic pipe coupling kit as defined in claim 6 characterized in that said third member is substantially longer than at least one of said first and second end members.

8. A coupling kit as defined in claim 6 characterized in that said second member is provided with an outwardly extending radial flange.

9. A plastic pipe coupling kit as defined in claim 6 characterized in that said second end member has provision for coupling at least three pipes together.

10. A plastic pipe coupling kit as defined in claim 6 characterized in that one of said first and second end members is so constructed that only one end thereof can be telescopically assembled to an end of plastic pipe being coupled.

11. A plastic pipe coupling kit as defined in claim 6 characterized in that first and second end members include means for preventing the assembly thereof to plastic pipe undergoing repair except from one end only of said end members.

12. A pipe coupling kit as defined in claim 6 characterized in that the magnitudes of said slightly smaller diameters have been determined as a result of tests of that axially directed force which is required to engage said coupling member against said third interference fit, said slightly smaller diameters having been adjusted to those values which cause said axially directed engaging force to be nearly constant throughout the engagement length thereof, whereby said slightly smaller diameters are, after said first end member has been assembled with interference fit to the adjacent plastic pipe end, very close to being uniform throughout.

13. A pipe coupling kit as defined in claim 6 characterized in that at least one of the edges at the ends of the said three members is chamfered to facilitate assembly of the coupling.

14. A pipe coupling kit as defined in claim 6 characterized in that the inner rim edge at the leading end of said third member is chamfered to facilitate the telescopic assembly thereof over said first and second end members.

* * * * *